Feb. 8, 1955
W. E. WOLFE
2,701,548
AUTOMATIC POULTRY FEED AND WATER DISPENSER
Filed Aug. 3, 1953
3 Sheets-Sheet 1
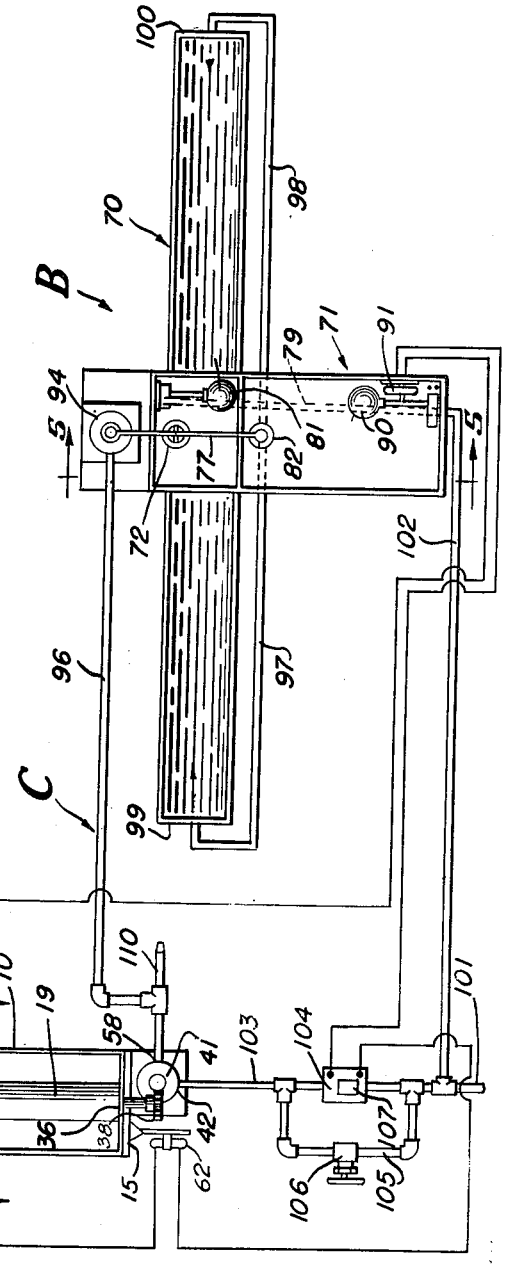
INVENTOR
William E. Wolfe
BY Cushman, Darby & Cushman
ATTORNEYS

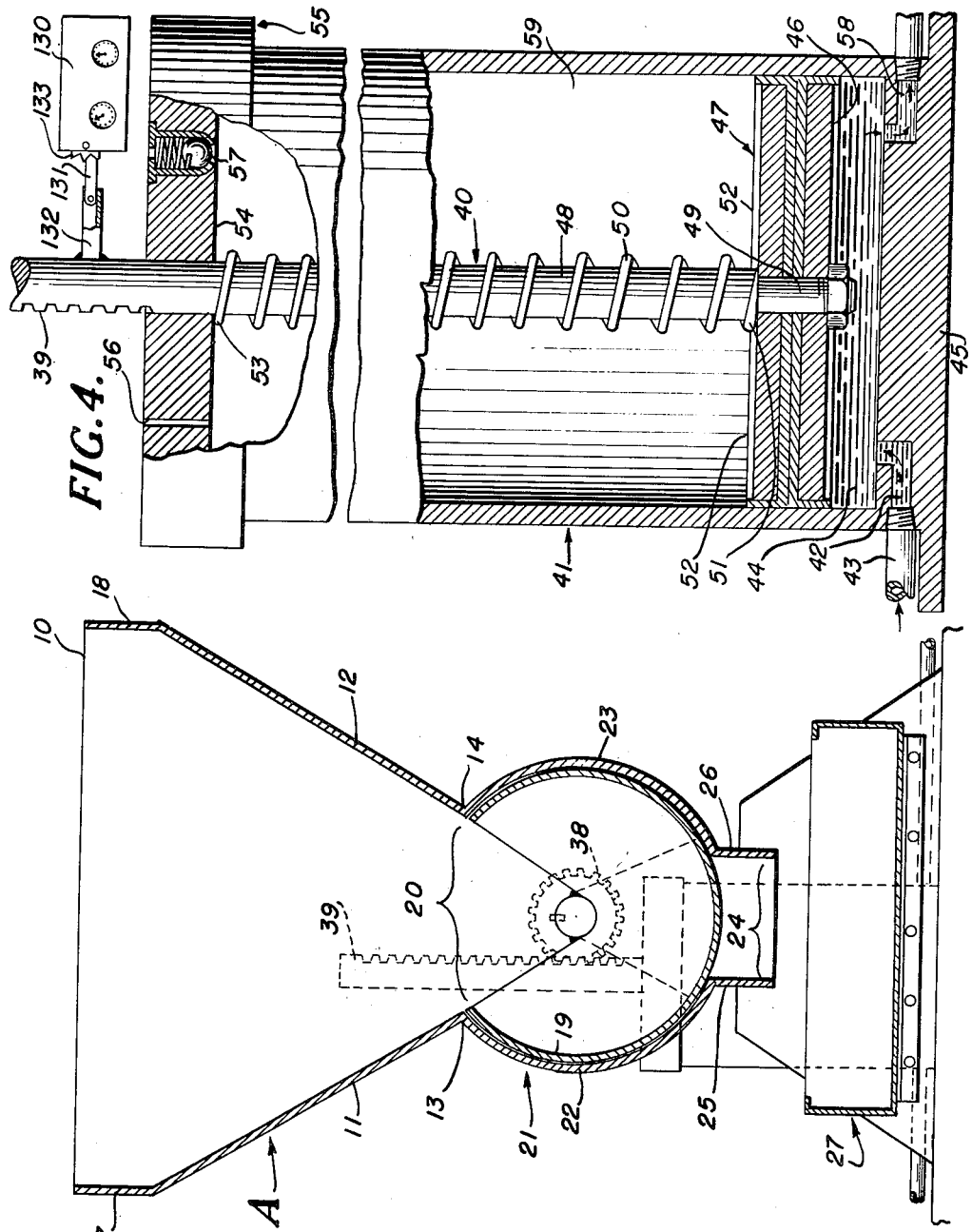

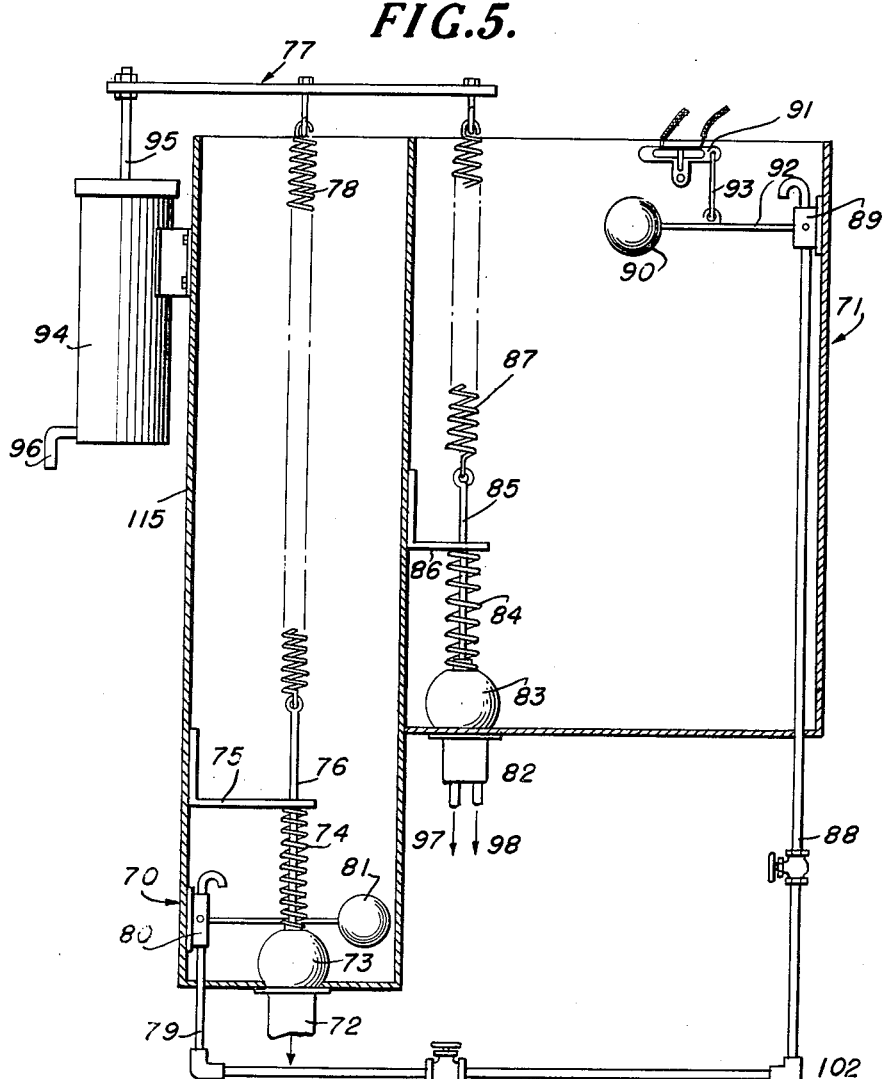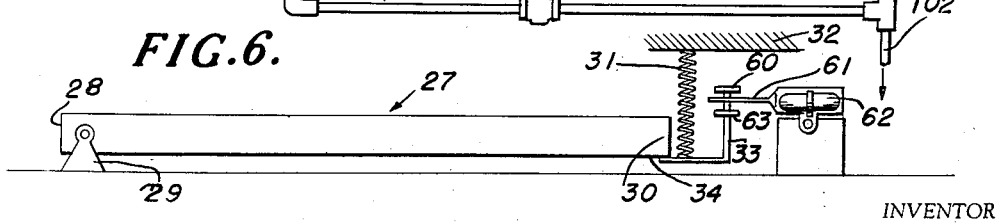

United States Patent Office 2,701,548
Patented Feb. 8, 1955

2,701,548

AUTOMATIC POULTRY FEED AND WATER DISPENSER

William E. Wolfe, Grottoes, Va.

Application August 3, 1953, Serial No. 371,766

16 Claims. (Cl. 119—51.5)

This invention relates to automatic poultry feed and water dispensers and in particular to such devices which are responsive to the rate at which feed is consumed. More specifically this invention relates to improvements in poultry feed and water dispensers in which the water dispensing portion of the device is controlled by the feed dispensing portion of the device.

In the breeding of poultry many disease germs are found in and around the water trough, since it is inevitable that litter, filth and droppings will get into the water trough if the water is allowed to stand for long periods of time. Accordingly, it is not enough to keep the trough full of of water, such as by automatic regulating means, rather it must be emptied and flushed periodically to reduce the hazard of spreading disease at this source.

The natural tendency of poultry is to eat and then to drink. One thousand birds will consume approximately thirty pounds of feed per day at one week old and approximately two hundred twenty pounds of feed when ten weeks old. It is therefore desirable that an automatic feeder be available to compensate for varying demand for feed depending upon the age of the birds and at the same time automatically adjust the supply of fresh, clean water to correspond with the rate at which the feed is being consumed.

It is the primary object of this invention to provide a combination poultry feed and water dispenser which is adapted to take advantage of the feeding and drinking habits of the poultry so as to provide fresh wholesome feed as required and to further provide clean, fresh water automatically and responsive to the rate at which the feed is consumed.

It is another object of this invention to provide an automatic poultry feeder and waterer which is entirely automatic in dispensing feed and water to a flock of poultry and yet is free from complicated electrical and mechanical devices with which the average poultry farmer is unfamiliar.

It is still another object of this invention to provide a poultry feeder which will automatically dispense feed into a feed trough when a predetermined amount of feed has been removed from the trough, the said automatic dispensing of this feed causing an associated water trough to be automatically flushed and refilled with fresh water.

It is a further object of this invention to provide a combination poultry feed and water dispenser which is entirely automatic in operation and which is adapted to induce poultry to eat more feed by dispensing fresh feed oftener in smaller quantities.

A still further object of this invention is to provide an automatic poultry feed and water dispenser which is adapted to save labor and eliminate human error in judgment as to the correct amount of feed to supply the flock at a given time.

It is yet a still further object of this invention to provide an automatic poultry feed and water dispenser which is adapted to prevent the poultry from picking over and polluting large quantities of expensive chicken feed.

It is an important object of this invention to provide an automatic poultry feed and water dispenser which will furnish feed to the flock at hours of the day most effective for such consumption.

Another important object of this invention is to provide an automatic poultry feed and water dispenser which is adaptable for use with small flocks in which a series of these dispensers may be provided for separate flocks of different ages whereby each flock will receive the proper amount of feed corresponding to its age and feed requirements.

It is yet another important object of this invention to provide an automatic poultry feed and water dispenser which is specifically adapted to control and eliminate diseases common to the feeding places of poultry.

Other objects and advantages of the invention will be apparent during the course of the following description.

In the accompanying drawings, forming a part of this application, and in which like numerals are employed to designate like parts throughout the same, Figure 1 is a plan view of a preferred embodiment of the invention showing the inter-relation between the feed dispenser and watering trough.

Figure 2 is a diagrammatic sketch of the wiring circuit employed in this invention to automatically coordinate the water trough with the feed dispenser.

Figure 3 is an enlarged sectional elevation of the feed dispenser taken on the line 3—3 of Fig. 1.

Figure 4 is an elevational view of one of the hydraulic cylinders employed to automatically operate the invention, with parts in section to disclose the interior details of the cylinder.

Figure 5 is an enlarged sectional elevation of the water trough and flushing tank used in the preferred embodiment of this invention, taken on the line 5—5 of Fig. 1, and Figure 6 is a side elevation of the feed trough used in the preferred embodiment of this invention showing how it is pivotally mounted on one end and spring supported on the opposite end, so as to be responsive to the weight of the charge of feed in the trough.

A preferred embodiment of this invention, as illustrated in the drawings, is comprised of four basic components, namely, (A) a combination feed dispenser and feed trough unit; (B) a combination water trough and water flushing tank unit; (C) a hydraulic system interconnecting and co-ordinating the water dispensing unit with the feed dispensing unit; and (D) the electrical circuit employed to automatically control and integrate the overall system.

For clarity of description, the above four units will be described separately in this order, followed by a general discussion of the inter-relation of the separate units.

*Combination feed dispenser and feed trough unit*

The feed dispenser A is comprised of a feed storage bin 10 (Figs. 1 and 3) having inwardly directed side panels 11 and 12 (Fig. 3) spaced apart at their lower edges 13 and 14 and vertically disposed end portions 15 and 16 (Fig. 1) integrally secured to the edges of said inwardly directed panels. The top portions 17 and 18 of said panels are extended vertically upward any desired height to provide ample feed storage space sufficient to operate the invention for any predetermined length of time.

A feed measuring and dispensing cylinder 19 is horizontally and pivotally positioned beneath the hopper for sliding contact with the lower edges 13 and 14 of the side panels 11 and 12. This cylinder has an opening 20 extending longitudinally from end to end and of sufficient width to mate with the space between the lower edges 13 and 14 of the side panels 11 and 12.

A cylinder housing 21 (Fig. 3), comprising two substantially semi-cylindrical portions 22 and 23 adapted to house the cylinder 19 for rotatable movement therein extends the length of the cylinder and has its upper edge portions integrally secured to the adjacent lower edges 13 and 14 of the side panels. A feed discharge chute 24 comprising spaced lower portions 25 and 26 of housing 21 is mated with the opening 20 in the feed dispensing cylinder 19 when said cylinder is rotated so as to have its opening in a downwardly facing position.

A feed trough 27 (Fig. 6) is positioned beneath the discharge chute 24 of the cylinder housing so as to receive grain which is passed through this discharge opening. One end 28 of the feed trough is pivotally mounted on a bracket 29, and the opposite end 30 is resiliently supported by a spring 31 attached at one end to the trough and at the other end to any stationary surface 32. In a preferred embodiment of this invention an L-shaped limit-switch arm 33 is integrally secured to the bottom 34 of the trough 27 and extends outwardly from the end 30 and upwardly for engagement with a mercury switch 62.

Feed dispenser cylinder 19 which is entirely enclosed with the exception of the opening 20 above described has circular end portions 36 and 37 integrally secured to the opposite ends of the main cylindrical body. A spur gear 38 (Figs. 1 and 3) is secured concentric with one end 36 of the cylinder 19 for meshed engagement with a rack 39 (Figs. 3 and 4) formed in the upper portion of a piston rod 40 (Fig. 4) adapted for reciprocal vertical movement in a hydraulic cylinder 41.

The hydraulic cylinder 41 (Fig. 4) is adapted to receive a source of hydraulic pressure, such as water, through inlet port 42 to which a fitting 43 is threadedly secured, whereupon the chamber 44 intermediate the bottom 45 of the hydraulic cylinder 41 and the lower face 46 of the piston 47 is filled with fluid. The portion 48 of the piston rod 40 which is normally enclosed within the hydraulic cylinder is of smooth cylindrical configuration secured at its lower end 49 to the piston and having a spring 50 encircling the rod so as to bear at its lower end 51 on the upper surface 52 of the piston and at its upper end 53 against the lower surface 54 of the top hydraulic cylinder cap 55. The spring 50 is in its normal position, as shown, being neither under compression nor tension. A capillary tube 56 is provided in the cap of the hydraulic cylinder to permit the free passage of air in and out of the cylinder and a spring-urged ball type air vent 57 is also secured in the cap of the hydraulic cylinder for rapid one-way movement of air outwardly from the interior of the hydraulic cylinder. A fluid discharge port 58 is provided in the base of the hydraulic cylinder for permitting the fluid to drain from the cylinder under certain conditions, as will be set forth more fully hereinafter.

Thus, it may be seen from the above description of the elements comprising the feed dispenser, that water pressure connected to inlet port 42 of hydraulic cylinder 41 (Fig. 4) will force piston 47 and the piston rod 40 secured thereto upwardly, evacuating the air from the upper chamber 59 of the cylinder through capillary tube 56 and ball check air vent 57. Since the rack portion 39 of the piston rod 40 is in engagement with the spur gear 38 secured to the feed dispensing cylinder 19, upward vertical movement of the piston rod will cause the spur gear to rotate thereby revolving the cylinder from the position shown in Fig. 3 180° until the open portion 20 of the cylinder is downwardly directed over the feed discharge chute opening 24 of the cylinder housing.

The above sequence will charge a measured amount of grain into the feed trough 27, thereby placing the spring 31 (Fig. 6) under tension and permitting the free end 30 of the trough to pivot downwardly. The amount of feed discharged from the dispensing cylinder is predetermined so that upper limit stop 60 will engage limit switch arm 61 of mercury switch 62 which will in turn open an electrical circuit to be more fully described hereinafter. As the flock feeds the quantity of grain in the trough is gradually lessened, allowing the spring 31 to rotate the free end 30 of the trough upwardly until lower limit stop 63 engages limit switch arm 61, whereupon the electrical circuit is once again closed and the cycle repeated.

The practical end result of opening limit switch 62 is to shut off the source of water pressure entering inlet port 42 (Fig. 4). When this source of pressure is cut off, spring 50 urges piston 47 downwardly, thereby forcing the water in the lower chamber 44 of the water cylinder out through outlet port 58. The upper chamber 59 is, as already noted, in constant contact with the atmosphere so that the piston will move freely downward when the water pressure is cut off. When a predetermined quantity of feed in the feed trough has been consumed, the practical effect of contact of lower limit stop 63 with limit switch arm 61 is to close an electrical circuit which will once again permit fluid pressure to enter port 42 of hydraulic cylinder 41 thereby repeating the feed dispensing cycle.

*Water dispensing unit*

A water dispensing unit (Figs. 1 and 5) is integrated with the operation of the feed dispensing unit and comprises a water trough 70 and a water trough flushing tank 71 (Fig. 5). The water trough is fitted with a drain 72 and a drain stopper 73 which is positively seated therein by means of a spring 74 positioned between the top of the stopper and the bottom face of angle bracket 75. Stopper connecting rod 76 is secured to a lifting arm 77 by means of a resilient connection 78. Water is admitted into the trough through pipe line 79 and valve 80, controlled by valve float 81 which automatically shuts off the supply of water at a predetermined level.

Water trough flush tank 71 is likewise provided with a drain 82 and a positively seated stopper 83 spring urged against the drain seat by means of spring 84 positioned about stopper connecting rod 85 intermediate the top portion of stopper 83 and the bottom face of angle iron bracket 86. Stopper connecting rod 85 is resiliently secured to lifting arm 77 by means of spring 87. Water is supplied to the tank by means of pipe line 88 passing through valve 89, which is operated by float 90 which automatically closes the valve when a predetermined level in the tank has been reached. A mercury switch 91 is secured to the upper portion of the tank and is connected to float arm 92 by means of connecting link 93 whereupon downwardly pivotal movement of float arm 92 will rotate mercury switch 91 and open an electrical circuit. The circuit will remain open until the tank has once again filled to the predetermined level, whereupon the float arm 92 will be pivoted upwardly, causing the connecting link 93 to reverse the position of the mercury switch, thereby re-closing the circuit.

A water cylinder 94, similar in operation and structure to the water cylinder illustrated in Fig. 4 and described above, is secured to the extended side 115 of water trough 70, whereby piston connecting rod 95 is adapted to engage one end of lifting rod 77. Thus, it may be seen that if the source of water pressure is admitted through pipe line 96 into water cylinder 94, piston rod 95 will be caused to move upwardly, thereby lifting horizontally disposed lifting arm 77 vertically and simultaneously removing stoppers 73 and 83 from their respective drains 72 and 82.

When the drains are opened, the water in trough 70 empties immediately down drain 72 and water from the water tank 71 enters drain 82 which is divided into trough flushing lines 97 and 98. Water from the tank courses equally through lines 97 and 98 (Fig. 1) and enters the water trough at opposite ends 99 and 100, thereby vigorously flushing all accumulated matter in the bottom of the trough inwardly toward the center of the trough and out through the trough drain 72. When the water has lowered sufficiently to allow float arm 92 to pivot downwardly, mercury switch 91 is caused to rock clockwise, opening a circuit which causes the source of water supply to water cylinder 94 to be cut off. The water in this water cylinder then drains back out through the same line 96 in which it entered, allowing the piston rod to move downwardly and the drain stoppers to once again re-seat in their respective drains. Floats 81 and 90 open valves 80 and 89 respectively, allowing water from an independent source of supply from that of the water cylinder to once again enter the trough and the water tank. Once the trough and tank are re-filled, mercury switch 91 is rotated counterclockwise, closing the electrical circuit and thereby readying the unit for another cycle of operation.

*The hydraulic system*

Both the feed dispensing unit and the water dispensing unit are operated by the same source of water pressure and are thereby interlocked and integrated so that one will not operate without the other and accordingly when the one unit does operate the other will also function. The timing of this system is such that the feed dispenser will first function and control the operation of the hydraulic system until the water dispensing unit is brought into operation, whereupon the water dispensing unit takes over control from the feed dispensing unit until the water trough flushing tank has been emptied and refilled. The refilling of the water trough flushing tank completes the cycle and returns the control to the feed dispensing unit.

Referring once again to Fig. 1 a source of water pressure is made available through pipe line 101, of which one branch 102 goes directly to the water trough and water trough flushing tank and is controlled completely and independently by the combination valves and floats secured thereto as aforesaid. Thus, the supply of water in these two water containers is independent of the remaining elements of the system and is controlled solely by the operation of the float-actuated valves 80 and 89. The second branch 103 of the source of water supply is piped directly to water cylinder 41 but with a solenoid-operated water valve 104 disposed intermediate the source of supply 101 and the water cylinder 41. A by-pass 105 is also provided around the solenoid-operated water valve and a hand-operated valve 106 is fitted into this by-pass. Thus, the water passes into the inlet port 42 of the water cylinder and when the water cylinder is full the surplus or overflow passes through the outlet port 58 (Fig. 4) and through pipe line 96 into water cylinder 94. When limit switch 62 (Fig. 6) is closed by the upward movement of lower stop 63 and electrical circuit is completed which actuates solenoid 107 (Figs. 1 and 2), causing the valve 104 to open, thus starting the automatic cycle of operation of the combination feed and water dispenser.

The piston rod 40 of hydraulic cylinder 41 moves upwardly operating spur gear 38 causing feed to be charged into the feed trough 27. Almost concurrently with the charging of the feed trough, a piston rod 95 of hydraulic cylinder 94 is forced upwardly by the water which has passed through water cylinder 41, thereby causing lifting arm 77 to unseat stoppers 73 and 83 from drains 72 and 82, as aforesaid. In order that the water trough may have ample time to drain and be thoroughly flushed, lifting arm 77 is allowed to return slowly to its normal position of rest as piston rod 95, secured to the piston in the water cylinder 94, moves vertically downward as water in the water cylinder is slowly forced back through pipe line 96 for discharge through capillary tube 110. Thus, for all practical purposes both water cylinders are energized at approximately the same time and both are drained into a common capillary tube 110 which meters the water through the open end of this tube for convenient disposal.

By allowing the pistons in both water cylinders to slowly return to their normal positions of rest in the bottom of the cylinders, two important advantages are obtained in the operation of this system, (1) the feed dispensing cylinder is allowed to return slowly and silently to its position prior to the operation of this cycle whereby the flock is not frightened by sudden movements or unexpected noises and (2) the stoppers in water trough 70 and water tank 71 are not re-seated until sufficient time has elapsed to enable the water trough to be thoroughly flushed.

*Electrical circuit*

The electrical circuit per se is diagrammatically shown in Fig. 2 wherein a master clock 120 exercises overall control of the electrical system which is integrated with and dominates the hydraulic circuit of the invention. A source of electrical energy 121 is available to the clock which may be adjusted and set to meter electrical energy to the electrical circuit only during such predetermined periods of day as it is desired that feed and water be supplied to the flock. When the master clock closes the overall circuit a series of lights 122 connected in parallel and secured along the lower edges of the feed bin (Fig. 1) are lighted to attract the attention of the birds and provide illumination while they are feeding. Normally open mercury limit switch 62 is operated as aforesaid by the pivotal movement of the feed trough, and when a predetermined amount of feed has been consumed, a solenoid 107 is energized to operate the solenoid-controlled valve 104 placed in the pipe line 103 intermediate the source of water supply 101 and the water clock 41. Normally closed mercury switch 91 is pivotally mounted in the upper portion of water trough flush tank and when the solenoid 107 opens the solenoid-operated valve 104 water pressure is admitted to water cylinder 94. Stopper 83 is lifted from its seat over the drain 82 in the tank 71, thereby allowing float 90 to pivot downwardly and open mercury switch 91, thus suspending the operation of another cycle until the water tank and trough have had a chance to refill. The operation of this switch 91 insures that the cycle will be repetitive since without it a malfunction of the solenoid valve or mercury limit switch might result in maintaining pressure in the water cylinder 94 whereby the stoppers 73 and 83 could not reseat and the water trough would be unable to refill. Once the switch 91 is opened, however, solenoid 107 is deactivated and solenoid-operated valve 104 must normally close releasing the pressure of the water cylinders and allowing the feed trough, and the water trough, to regain their normal conditions, i. e. that of a full feed trough and of a full water trough.

*Operation*

Having explained the various sub-combinations of this invention and their operations in detail, it will be readily apparent that an automatic combination poultry feed and water dispenser is provided having but simple electrical and hydraulic circuits which most unskilled persons can understand and maintain in operating condition.

In operation the feed bin may be divided into as many sub-compartments as desired for storing the different feed mixes required for a balanced diet. This bin is preferably constructed of sheet metal and completely enclosed so as to be rat or vermin proof. Once the feed bin is filled and the hydraulic circuit is tapped into a source of water supply the master clock can then be set to establish the periods during which the system will operate. After the birds have consumed a predetermined quantity of feed, spring 31 will urge the free end of feed trough 27 upwardly, thereby closing mercury switch 62 which will in turn energize solenoid 107 and open solenoid-controlled valve 104 thus admitting water pressure into the hydraulic system.

The pistons in both water cylinders are forced upwardly whereby grain is dispensed from the storage bins and the water in the water trough is drained and flushed. While the water trough flush tank is being refilled the dispensing cylinder is slowly and silently being returned to its original position in readiness for another cycle. When the water trough flush tnak has become refilled mercury switch 91 is re-closed and mercury switch 62 is reopened. The system is then prepared to operate through another cycle when the feed has reached the aforementioned predetermined level in the feed trough.

Thus, in essence the entire system is responsive to a predetermined amount of feed in the feed trough and this amount can be regulated so as to be best suited to the needs of the particular flock using the dispenser. For instance, with chicks the amount of feed dispenser during each cycle can be regulated so as to be considerably less than when the birds are several weeks old.

Because this unit is relatively small and compact it is ideally suited for separating flocks of different age groups and feeding these flocks separately in different sections of the hennery.

It is of course apparent from an examination of Fig. 1 that should electric power fail, the system can be operated manually by use of the by-pass 105 and operation of valve 106 by hand.

The hydraulic system works equally well whether the pressure is obtained from a source such as a local storage tank or portable tank car or whether it is tapped directly into a permanent water system, such as a municipal water main.

A counter 130 may be attached to the feed line 11 to record the number of units of feed charged into the feed trough 27 during any given period. A pawl 131 secured to rack 39 by arm 132 may be employed to engage star wheel 133 of the counter each time a unit of feed is charged into the feed trough.

It is to be understood that the form of my invention, herewith shown and described, is to be taken as a preferred assembly of the same, in that various changes in the shape, size and embodiment of the parts may be resorted to without departing from the spirit of my invention or the scope of the appended claims.

I claim:

1. An automatic poultry feed and water dispenser comprising a feed trough, feed dispensing means discharging into said feed trough, a hydraulic cylinder operatively engaged to said feed dispensing means, means responsive to the weight of feed in said feed trough to actuate said hydraulic cylinder, a water trough adjacent said feed trough, means for flushing and refilling said water trough, and means responsive to the actuation of said hydraulic cylinder to actuate said flushing and refilling means.

2. Apparatus as defined in claim 1, wherein said feed trough is supported at one end by pivotal means and at the other end by resilient means, whereby said resiliently supported end is adapted to pivot about said pivotally supported end in accordance with the weight of feed in said feed trough, and including means secured to the resiliently supported end of said feed trough to actuate said hydraulic cylinder.

3. Apparatus as defined in claim 2, wherein said means for actuating said hydraulic cylinder includes an electric switch, means secured to the resiliently supported end of said feed trough carrying lower and upper limit stops, said upper limit stop being adapted to engage and open said switch when said feed trough is caused to pivot downwardly a distance predetermined by the weight of grain charged into said feed trough, said lower limit stop being adapted to engage and close said switch when said trough is caused to pivot upwardly a predetermined distance by said resilient support as the grain in said trough is consumed, a conduit connected to said hydraulic cylinder, an electrically actuated valve in said conduit, an electrical circuit including said switch and said valve, and means for electrically energizing said circuit whereby said valve is opened when said limit stop is closed.

4. An automatic poultry feed and water dispenser comprising a feed trough, feed dispensing means discharging into said feed trough, said feed dispensing means including a feed storage bin positioned above said feed trough and horizontally rotatable feed measuring means positioned intermediate said bin and said feed trough, a hydraulic cylinder operatively engaged to said feed measuring means, means responsive to the weight of feed in said feed trough to actuate said hydraulic cylinder, a water trough adjacent said feed trough, means for flushing and refilling said water trough, and means responsive to the actuation of said hydraulic cylinder to actuate said flushing and refilling means.

5. Apparatus as defined in claim 4, wherein said feed storage bin has downwardly converging sides, spaced apart at their lower edges, and said feed measuring means comprises a horizontally rotatable hollow feed measuring cylinder positioned beneath said converging sides and adjacent thereto, and an opening in said cylinder extending longitudinally thereof, the edges of said opening being adapted to mate with the said lower edges of said feed bin converging sides.

6. Apparatus as defined in claim 5, wherein said hydraulic cylinder comprises a piston and a piston rod slidably secured therein, said piston rod including a rack formed in its outer free end, and including a gear integrally secured to an end of said measuring cylinder, said gear being disposed in meshing engagement with said rack, whereby actuation of said hydraulic cylinder will effect axial movement of said piston rod and rotation of said measuring cylinder.

7. Apparatus as defined in claim 6, wherein said hydraulic cylinder comprises a fluid input connection in one end thereof, a fluid discharge connection in the same end thereof, a capillary tube secured to said discharge connection, a capillary air vent in the opposite end of said cylinder, a ball check air vent in said opposite cylinder end, and resilient means intermediate said piston and said cylinder opposite end adapted to urge said piston toward said first mentioned cylinder end to discharge liquid from said cylinder through said capillary tube.

8. An automatic poultry feed and water dispenser comprising a feed trough, feed dispensing means discharging into said feed trough, a hydraulic cylinder operatively engaged to said feed dispensing means, a bottom drain in said water trough, a stopper in said drain, conduit means for supplying water to said water trough, a float-controlled valve in said conduit mounted on said water trough, a float secured to said valve for controlling the liquid level in said water trough, and means responsive to actuation of said hydraulic cylinder to remove said stopper from said drain and flush said water trough while said stopper is removed.

9. Apparatus as defined in claim 8, wherein said means for removing said stopper from said drain and flushing said water trough includes a second hydraulic cylinder, a piston rod extending from said second hydraulic cylinder, a cross arm extending from said piston rod transversely over said water trough, and means securing said stopper to said cross arm, whereby said stopper is lifted from said drain when said piston rod is extended from said second hydraulic cylinder.

10. Apparatus as defined in claim 8, including a flushing tank positioned above said water trough, a drain in the bottom of said flushing tank, and a stopper in said flushing tank drain, said means for removing said water trough stopper being connected to simultaneously remove said flushing tank stopper.

11. Apparatus as defined in claim 8, including a flushing tank positioned above said water trough, a drain in the bottom of said flushing tank, and a stopper in said flushing tank drain, and wherein said means responsive to actuation of said hydraulic cylinder comprises a second hydraulic cylinder, a piston rod extending from said second hydraulic cylinder, a cross arm extending from said piston rod transversely over said water trough, and means securing said water trough stopper and said flushing tank stopper to said cross arm, whereby said stoppers are simultaneously lifted from their respective drains when said piston rod is extended from said second hydraulic cylinder.

12. Apparatus as defined in claim 8, wherein said means for flushing said water trough includes a flushing tank positioned above said water trough, a drain in the bottom of said flushing tank, conduits leading from said flushing tank drain to opposite ends of said water trough, a stopper in said flushing tank drain, means for supplying water to said flushing tank, a float-controlled valve in said supply means mounted on said flushing tank, a float secured to said flushing tank valve for controlling the liquid level therein, an electric switch mounted on said flushing tank adapted to be opened by downward movement of the float therein, an electrically actuated valve controlling said hydraulic cylinder, an electrical circuit including said switch and said electrically actuated valve, means for energizing said circuit, and means responsive to actuation of said hydraulic cylinder to remove said flushing tank stopper from said flushing tank drain.

13. An electro-mechanical automatic poultry feed and water dispenser comprising a feed trough pivotally mounted at one end and resiliently mounted at the opposite end thereof, an electric switch disposed adjacent the resiliently mounted end of said feed trough in such manner as to be opened by downward pivotal movement of said trough and closed by upward pivotal movement of said trough, a feed bin positioned above said feed trough, feed charging means associated with said feed bin, a first hydraulic cylinder and piston, gear means engaging said first hydraulic cylinder piston to said feed charging means, a conduit connected at one end to a source of fluid pressure and at its opposite end to said first hydraulic cylinder, an electrically actuated valve in said conduit, said electrically actuated valve and said switch being in electrical series connection, a water trough adjacent said feed trough, a flushing tank positioned above said water trough, drains in the bottoms of said water trough and said flushing tank, a stopper in each of said drains, flushing conduits connecting said flushing tank drain to said water trough, a conduit connected to a source of water and to said water trough and said flushing tank, a float-controlled valve in said water trough adapted to control the flow of water through said conduit means into said water trough, a float secured to said water trough valve, a float-controlled valve in said flushing tank adapted to control the flow of water through said conduit into said flushing tank, a float secured to said flushing tank valve, an electric switch mounted on said flushing tank adapted to be opened by downward movement of the float therein, said flushing tank switch being in electrical series connection with said feed trough switch and said electrically actuated valve, a second hydraulic cylinder and piston connected by fluid conduit to said first hydraulic cylinder, a capillary tube discharge outlet in said fluid conduit connecting said hydraulic cylinders, means connecting said second hydraulic cylinder piston to said water trough stopper and to said flushing tank stopper whereby movement of said hydraulic cylinder piston may simultaneously lift both stoppers from their respective drains, said hydraulic cylinders acting simultaneously in response to fluid pressure when said electrically actuated valve is opened by closing of said feed trough switch.

14. Apparatus as defined in claim 13, including a by-pass around said electrically actuated valve, and a hand operable valve in said by-pass, whereby the system may be operated independently of its electrical controls.

15. Apparatus as defined in claim 13, including an electrical time clock in series with said switches, whereby the system is limited to operation during predetermined periods controlled by said time clock.

16. Apparatus as defined in claim 13, including an electrical time clock in series with said limit switches, whereby the system is limited to operation during predetermined periods controlled by said time clock, and electrical illuminating means mounted adjacent said feed trough and adapted to be lit during said predetermined periods.

References Cited in the file of this patent

UNITED STATES PATENTS

| | | |
|---|---|---|
| 1,029,623 | Nieman | June 18, 1912 |
| 1,134,934 | Woodizka | Apr. 6, 1915 |
| 1,207,938 | Kuxmann | Dec. 12, 1916 |
| 1,219,114 | Lappas | Mar. 13, 1917 |
| 2,502,720 | Haley | Apr. 4, 1950 |
| 2,669,218 | Erickson | Feb. 16, 1954 |